US009442281B2

(12) United States Patent
Hayashi et al.

(10) Patent No.: US 9,442,281 B2
(45) Date of Patent: Sep. 13, 2016

(54) MICROSCOPE AND SHUTTER MECHANISM

(71) Applicant: Sony Corporation, Tokyo (JP)

(72) Inventors: Kunihiko Hayashi, Kanagawa (JP);
Ryu Narusawa, Kanagawa (JP);
Takashi Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/408,092

(22) PCT Filed: Apr. 23, 2013

(86) PCT No.: PCT/JP2013/002738
§ 371 (c)(1),
(2) Date: Dec. 15, 2014

(87) PCT Pub. No.: WO2014/002354
PCT Pub. Date: Jan. 3, 2014

(65) Prior Publication Data
US 2015/0177505 A1      Jun. 25, 2015

(30) Foreign Application Priority Data

Jun. 27, 2012  (JP) ................................. 2012-144370

(51) Int. Cl.
G02B 21/36  (2006.01)
G02B 21/18  (2006.01)
H04N 5/225  (2006.01)
(Continued)

(52) U.S. Cl.
CPC .............. *G02B 21/361* (2013.01); *G02B 21/18* (2013.01); *G02B 21/365* (2013.01); *G02B 26/02* (2013.01); *G02B 26/04* (2013.01); *G03B 9/08* (2013.01); *H04N 5/2254* (2013.01)

(58) Field of Classification Search
CPC .. G02B 21/361; G02B 21/365; G02B 26/04; G02B 21/18; G02B 26/02; G03B 9/08; G03B 9/36; H04N 5/2254
USPC ................................. 359/227, 230, 368, 739
See application file for complete search history.

(56) References Cited

U.S. PATENT DOCUMENTS 3,987,463 A * 10/1976 Nishikawa ............... G03B 7/18
                                                      359/374
4,052,727 A * 10/1977 Ito ............................ G03B 7/00
                                                      396/245
4,568,188 A *  2/1986 Weber ................ G02B 21/0096
                                                      356/139.05

(Continued)

FOREIGN PATENT DOCUMENTS

JP        61-269698        11/1986
JP        01-169305         7/1989
(Continued)

*Primary Examiner* — Frank Font
(74) *Attorney, Agent, or Firm* — K&L Gates LLP

(57) ABSTRACT

To provide a shutter mechanism that has high durability and is capable of operating at high speed and a microscope that includes the shutter mechanism. A microscope according to the present technology includes an optical system, a first light-receiving element, and a shutter mechanism. The shutter mechanism includes a rotation power source that generates rotation power, a crank that converts the rotation power generated by the rotation power source into a back-and-forth movement, and a shutter connected to the crank, the shutter moving back and forth according to the crank between a first position at which a first optical path from the optical system to the first light-receiving element is blocked and a second position at which the first optical path is not blocked.

9 Claims, 13 Drawing Sheets

(51) Int. Cl.
*G02B 26/02* (2006.01)
*G03B 9/08* (2006.01)
*G02B 26/04* (2006.01)

(56) References Cited

U.S. PATENT DOCUMENTS

| | | | | |
|---|---|---|---|---|
| 4,690,519 | A * | 9/1987 | Clark | G02B 21/24 259/376 |
| 6,550,939 | B2 * | 4/2003 | Reinert | F21V 11/18 359/227 |
| 2006/0097680 | A1 * | 5/2006 | Belgum | G02B 26/02 318/466 |
| 2012/0044558 | A1 * | 2/2012 | Kansaku | G03B 21/2053 359/227 |
| 2012/0075521 | A1 * | 3/2012 | Tsai | G03B 9/36 348/367 |
| 2012/0082447 | A1 * | 4/2012 | Jung | G03B 9/08 396/213 |
| 2013/0223835 | A1 * | 8/2013 | Koeroghlian | H02K 41/031 396/463 |
| 2013/0343744 | A1 * | 12/2013 | Niwamae | G03B 9/10 396/493 |

FOREIGN PATENT DOCUMENTS

| | | |
|---|---|---|
| JP | 02-281223 | 11/1990 |
| JP | 3789169 | 12/1997 |
| JP | 10-334624 | 12/1998 |
| JP | 2000-175494 | 6/2000 |
| JP | 2001-221951 | 8/2001 |
| JP | 2001-281725 | 10/2001 |
| JP | 2006-0039219 | 2/2006 |
| JP | 2009-128482 | 6/2009 |
| JP | 2012-073285 | 4/2012 |

* cited by examiner

MICROSCOPE AND SHUTTER MECHANISM

CROSS REFERENCES TO RELATED APPLICATIONS

The present application is a national stage of International Application No. PCT/JP2013/002738 filed on Oct. 4, 2012 and claims priority to Japanese Patent Application No. 2012-144370 filed on Jun. 27, 2012, the disclosure of which is incorporated herein by reference.

BACKGROUND

The present technology relates to a microscope that can be used for digital imaging and a shutter mechanism that can be used for the microscope.

Some general imaging apparatuses include a mechanical shutter. The mechanical shutter is configured to be capable of blocking an optical path between an imaging optical system and an imaging element (e.g., a complementary metal oxide semiconductor image sensor, hereinafter, referred to as CMOS image sensor), and prevents light from entering the imaging element in an unintended time and period as necessary.

The mechanical shutter has various configurations. However, a general mechanical shutter includes a shutter that is slidably mounted on a guide rail and moves back and forth. The drive force to move the shutter back and forth is supplied from an electromagnet, for example. A stopper is provided at the end of the guide rail, and the stopper controls the movement range of the shutter.

Moreover, the following Patent Document 1 discloses a shutter for a camera in which a plurality of diaphragm blades are provided in the vicinity of the optical path. This shutter is configured to be capable of generating a large drive force momentarily with high voltage accumulated in a capacitor, and moving the diaphragm blades at high speed.

CITATION LIST

Patent Document

Patent Document 1: Patent No. 3789169

SUMMARY

Problem to be solved by the Invention

However, the above-mentioned mechanical shutter has a problem of durability. When a high magnification image of a sample (slide) is generated by a microscope, a method of imaging the sample for each partial area and combining them is used. In the method, it needs to open and close the mechanical shutter for each imaging for the partial area. The number of times of the imaging of the partial area may be several thousand times for one sample, for example, and the number of times of opening and closing the mechanical shutter can be several hundred million times a year if the case where several hundred samples are imaged is assumed. In addition, also the speed of the imaging is requested to be increased, and a mechanical shutter that operates at high speed is demanded.

However, in the above-mentioned mechanical shutter having the configuration in which the position of a shutter is controlled by a stopper, damage on the shutter or stopper or attrition of the guide rail is generated because the shutter collide with the stopper for each imaging. On the other hand, in the mechanical shutter that uses a capacitor, the durable number of times of storage and discharge of the capacitor is limited. As described above, the existing mechanical shutter does not have sufficient durability, and needs to be replaced earlier than the lifetime of the main body of the microscope in some cases.

Furthermore, the vibration caused due to the collision of the shutter with the stopper may affect an image, and the effect is significant as the speed of the imaging is increased.

In view of the circumstances as described above, it is an object of the present technology to provide a shutter mechanism that has high durability and is capable of operating at high speed and a microscope that includes the shutter mechanism.

Means for Solving the Problem

A microscope according to an embodiment of the present technology includes an optical system, a first light-receiving element, and a shutter mechanism. The shutter mechanism includes a rotation power source that generates rotation power, a crank that converts the rotation power generated by the rotation power source into a back-and-forth movement, and a shutter connected to the crank, the shutter moving back and forth according to the crank between a first position at which a first optical path from the optical system to the first light-receiving element is blocked and a second position at which the first optical path is not blocked.

With this configuration, the shutter moves back and forth with the rotation power generated by the rotation power source. Therefore, even at the first position and the second position being the maximum movement positions of the shutter that moves back and forth, the movement of the shutter does not need to be regulated by a stopper, and it is possible to suppress the wear or damage of the shutter and the effect on an image due to collision with the stopper.

The crank may include a first arm fixed to a rotation power axis of the rotation power source and a second arm that is rotatably connected to the first arm and the shutter, the first arm and the second arm may be connected to each other with a first rotational axis, and the second arm and the shutter may be connected to each other with a second rotational axis.

With this configuration, it is possible to convert the rotational movement of the rotation power axis into back-and-forth movement of the shutter by the first arm that rotates with the rotation power source and the second arm that moves in synchronization with the first arm.

The rotation power axis, the rotational axis, and the rotational axis may be arranged in the same straight line when the shutter is at the first position or the second position.

With this configuration, when the shutter is at the first position or the second position, i.e., when the rotation power axis starts to rotate, the rotation power axis, the rotational axis, and the rotational axis are arranged in the same straight line. It should be noted that because a torque reaction force on the first rotational axis is minimized when the rotation power axis, the first rotational axis, and the second rotational axis are arranged in the same straight line, it is possible to minimize a driving torque that is needed to start rotation of the rotation power axis.

The rotation power source is desirably a stepping motor.

The rotational angle of the stepping motor can be controlled with high accuracy, and the torque and rotation rate of the stepping motor can be adjusted by a pulse interval of supplied pulse power. Furthermore, the stepping motor generates a stopping torque when the rotation is stopped.

Specifically, because it is stopped with a stopping toque, it is possible to decide a position with high accuracy even if a stopper or the like is not used. In view of these characteristics, the stepping motor is favorable as the rotation power source of the shutter mechanism according to the present technology.

The microscope may further include a controller that supplies pulse power to the stepping motor, the controller reducing a pulse interval of the pulse power as the shutter is away from the first position or the second position.

With this configuration, when the shutter is at the first position or the second position, i.e., when the rotation power axis starts to rotate or stops rotating, it is possible to increase the torque of the rotation power axis and decrease the rotation rate. Thus, it is possible to suppress the loss in synchronism of the stepping motor and to easily break the movement of the crank and the shutter.

The microscope may further include a second light-receiving element and an optical path separation unit that separates the first optical path and a second optical path from the optical system to the second light-receiving element.

With this configuration, when the second light-receiving element is caused to receive light transmitted through the optical system, it is possible to block light to the first light-receiving element by the shutter mechanism.

The first light-receiving element may be an element for capturing an image, and the second light-receiving element may be an element for detecting a focal depth.

With this configuration, when the element for detecting a focal depth is caused to receive light, it is possible to block light to the element for capturing an image by the shutter mechanism.

The element for capturing an image may be a CMOS image sensor.

In the CMOS image sensor, a line of charges stored in a photoelectric conversion element is read successively. Therefore, after the photoelectric conversion element is exposed, it needs a time for reading charges, meanwhile the photoelectric conversion element needs to be prevented from receiving light. In the microscope according to the present technology, because it is possible to physically prevent an image capturing element from receiving light by the shutter mechanism, the element for detecting a focal depth can be caused to receive light in parallel therewith, i.e., it is possible to effectively use the time for reading charges of the CMOS image sensor (image capturing element).

The shutter mechanism may be fixed to the optical system via a vibration absorption member.

With this configuration, it is possible to absorb, with a vibration absorption member, the vibration generated due to the movement of the crank or the shutter in the shutter mechanism, and to prevent such vibration from affecting imaging performed by an image capturing element.

The microscope may further include a first detection sensor that detects the shutter at the first position and a second detection sensor that detects the shutter at the second position.

With this configuration, it is possible to know whether or not the shutter moves according to the pulse power supplied to the rotation power source by the first detection sensor and the second detection sensor.

A shutter mechanism according to an embodiment of the present technology includes a rotation power source, a crank, and a shutter. The rotation power source generates rotation power. The crank converts the rotation power generated by the rotation power source into a back-and-forth movement. The shutter is connected to the crank, the shutter moving back and forth according to the crank between a first position at which an optical path from an optical system to a first light-receiving element is blocked and a second position at which the optical path is not blocked.

The shutter mechanism may further include a controller that supplies pulse power to the stepping motor, the rotation power source being a stepping motor, the controller supplying pulse power to the stepping motor so that a driving profile of a pulse interval is a Sin curve.

The controller supplies pulse power to the stepping motor so that a profile of a pulse interval of pulse driving is a Sin curve. Accordingly, it is possible to smoothly accelerate and decelerate the stepping motor, and to suppress the loss of synchronism by a state of a large burden caused due to reduction of vibration and rapid change in speed.

The shutter mechanism may further include a controller that supplies pulse power to the stepping motor, the rotation power source being a stepping motor, the controller supplying inverted pulse to the stepping motor when the stepping motor is stopped.

If the controller supplies inverted pulse to the stepping motor when the stepping motor stops rotating, it is possible to cause the stepping motor to generate an inverted torque and to reduce the static speed.

An imaging apparatus for a microscope according to an embodiment of the present technology is an imaging apparatus for a microscope used in pathology, including a mechanistic light blocking means provided right before an imaging element.

Effect of the Invention

As described above, according to the present technology, it is possible to provide a shutter mechanism that has high durability and is capable of operating at high speed and a microscope that includes the shutter mechanism.

Additional features and advantages are described herein, and will be apparent from the following Detailed Description and the figures.

DETAILED DESCRIPTION

A microscope 100 according to an embodiment of the present technology will be described.

[Whole Configuration of Microscope]

Figure 1:
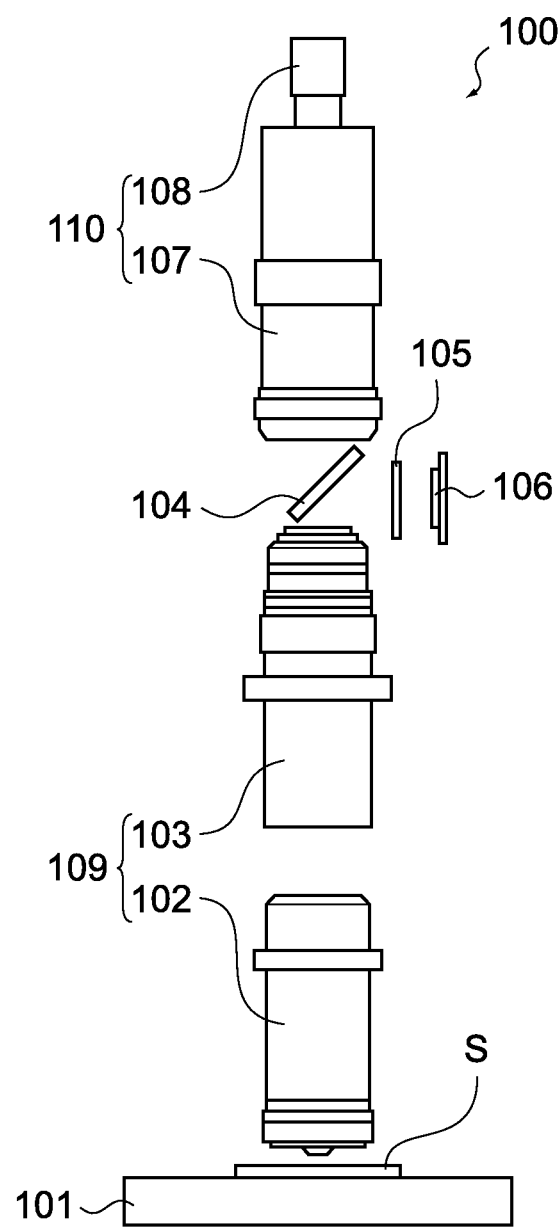
FIG. 1 A schematic diagram showing the configuration of a microscope according to an embodiment of the present technology.

FIG. 1 is a schematic diagram showing the whole configuration of the microscope 100.

As shown in FIG. 1, the microscope 100 includes a stage 101, an objective lens barrel 102, an imaging lens barrel 103, an optical path separation unit 104, a shutter mechanism 105, an imaging element 106, an autofocus (hereinafter, referred to as AF) lens barrel 107, and an AF sensor 108. Moreover, on the stage 101, a slide S being an imaging target is placed. It should be noted that a driving source for driving the stage 101 or illumination for the slide S can have the same configuration as that in the related art, and the illustration or description thereof is omitted.

The stage 101 is configured to be capable of moving, and defines the relative position of the slide S with respect to the objective lens barrel 102. The stage 101 is favorably capable of adjusting the position thereof in response to instruction from a controller (not shown) so that the imaging target area of the slide S is within the vision range of the objective lens barrel 102.

The objective lens barrel 102 houses an objective lens and magnifies an image of the imaging target area. The objective lens barrel 102 can have an arbitrary configuration.

The imaging lens barrel 103 houses an imaging lens, and forms an image magnified by the objective lens barrel 102. Also the imaging lens barrel 103 can have an arbitrary configuration.

In the following description, the objective lens barrel 102 and the imaging lens barrel 103 are collectively referred to as an optical system 109. The optical system 109 can be changed appropriately depending on the magnification, presence or absence of staining, or the like, and can include an excitation light cut filter or the like when fluorescence imaging is performed, for example.

The optical path separation unit 104 separates the optical path of the image formed by the imaging lens barrel 103 (hereinafter, referred to simply as optical path) into an optical path toward the imaging element 106 and an optical path toward the AF lens barrel 107. The detail thereof will be described later. The optical path separation unit 104 only needs to separate an optical path, and can be a half mirror, for example.

The shutter mechanism 105 is arranged between the optical path separation unit 104 and the imaging element 106, and blocks the optical path between them or release the blocking. The detail of the shutter mechanism 105 will be described later.

The imaging element 106 performs photoelectric conversion on light reached from the optical path separation unit 104, and performs imaging. The imaging element 106 can be a CMOS image sensor or a CCD (Charge Coupled Device) image sensor. However, the COMS image sensor is favorable in combining it with the shutter mechanism 105 (to be described later). Moreover, the CMOS image sensor is favorable in that the manufacturing cost thereof is lower than that of the CCD image sensor and it has a high degree of freedom of the shape of a photoelectric conversion element and a high degree of freedom of an output signal.

The AF lens barrel 107 includes a phase difference ring, a lens, or the like, and generates a phase difference image from light reached from the optical path separation unit 104. The AF lens barrel 107 can have an arbitrary configuration that is capable of forming a phase difference image.

The AF sensor 108 detects a focal depth of a sample included in the vision range of the optical system 109 from the phase difference image generated by the AF lens barrel 107. Specifically, the AF sensor 108 includes a line sensor or the like, and can detect a focal depth from the deviation of the phase difference image.

In the following description, the AF lens barrel 107 and the AF sensor 108 are collectively referred to as an AF optical system 110. It should be noted that the configuration of the AF optical system 110 is not limited to the one that uses a phase difference image, and only needs to be capable of detecting a focal depth of a sample.

[Regarding Optical Path Separation]

Figure 2:
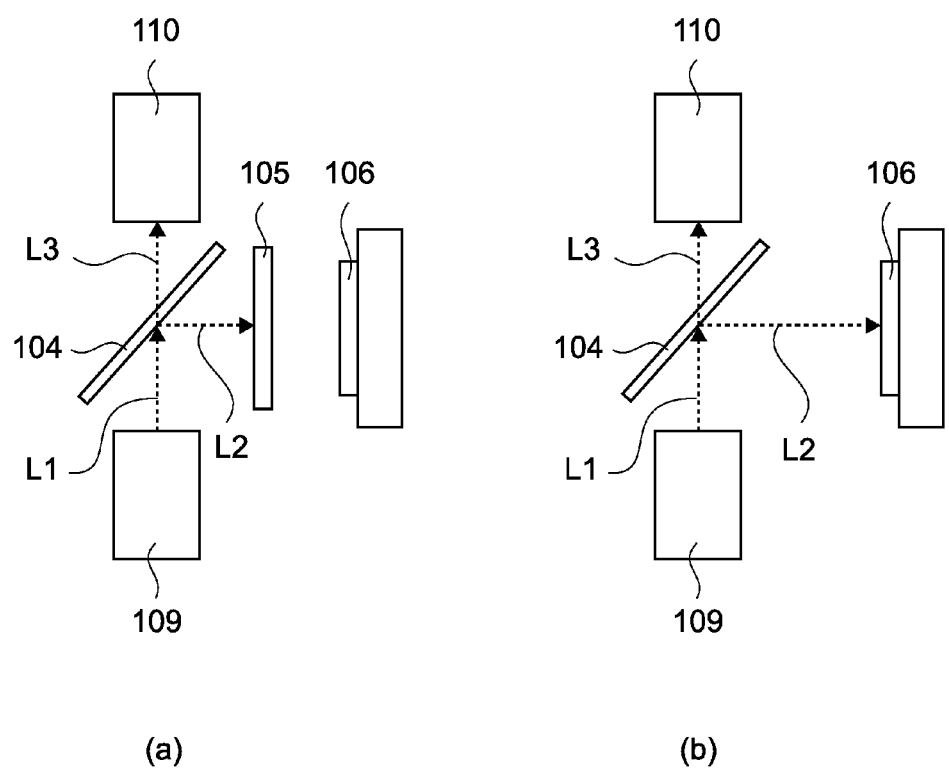
FIG. 2 A schematic diagram showing optical path separation by an optical path separation unit of the microscope.

FIG. 2 is a schematic diagram showing optical path separation by the optical path separation unit 104. FIG. 2(a) is a schematic diagram showing the state where the optical path is blocked by the shutter mechanism 105 (hereinafter, referred to as closed state), and FIG. 2(b) is a schematic diagram showing the state where the optical path is not blocked by the shutter mechanism 105 (hereinafter, referred to as opened state). As shown in the figure, light that has been transmitted through the optical system 109 is separated into light toward the imaging element 106 and light toward the AF optical system 110 by the optical path separation unit 104.

Hereinafter, an optical path running from the optical system 109 to the optical path separation unit 104 is referred to as an original optical path L1, an optical path running from the optical path separation unit 104 to the imaging element 106 is referred to as an imaging optical path L2, and an optical path running from the optical path separation unit 104 to the AF optical system 110 is referred to as an AF optical path L3. As shown in the figure, the shutter mechanism 105 is provided between the optical path separation unit 104 and the imaging element 106, i.e., blocks (FIG. 2(a)) or releases (FIG. 2(b)) the imaging optical path L2.

In the case where the optical path separation unit 104 is a half mirror, it is more favorable to direct reflected light to the imaging element 106 and direct transmitted light to the AF optical system 110, as shown in FIG. 2, than the opposite case. Because transmitted light of a half mirror includes light reflected in the half mirror, slurring of an image, or the like, may be generated in the case where the transmitted light of the half mirror is directed to the imaging element 106. On the other hand, in the AF optical system 110, it is possible to make effect of light reflected in the half mirror negligible.

As described above, by separating an optical path into optical paths for imaging and for AF, it is possible to detect a focal depth by the AF optical system 110 at high speed and with high accuracy. In general, the focal depth can also be detected by using an image sensor for imaging without separating an optical path (without separately providing an AF detection system). For example, by moving (scanning)

the stage or the like to the focal depth direction so that the contrast of a captured image is the maximum, such detection of a focal depth can be performed. However, this method needs a scanning time for each imaging, and it is difficult to use the method for pathological diagnosis or the like, which needs to capture a lot of images at high speed.

Therefore, the microscope 100 according to this embodiment has a configuration where the optical path separation unit 104 separates an optical path into optical paths for imaging and for AF. On the other hand, if light enters the imaging element 106 while the AF optical system 110 detects the focal depth, charges are stored in the photoelectric conversion element in the meanwhile, which affects the captured image. Therefore, the shutter mechanism 105 is needed for preventing light from entering the imaging element while the AF optical system 110 detects a focal depth.

Moreover, particularly in the case where the imaging element 106 is a CMOS image sensor, a time for transferring charges is needed because a line of charges is read successively in CMOS. It should be noted that if the shutter mechanism 105 can prevent the imaging element 106 from receiving light during the transferring time, the AF optical system 110 can detect a focal depth during the transferring time, i.e., it is possible to effectively use the transferring time (details thereof will be described later).

[Regarding Shutter Mechanism]

Figure 3:
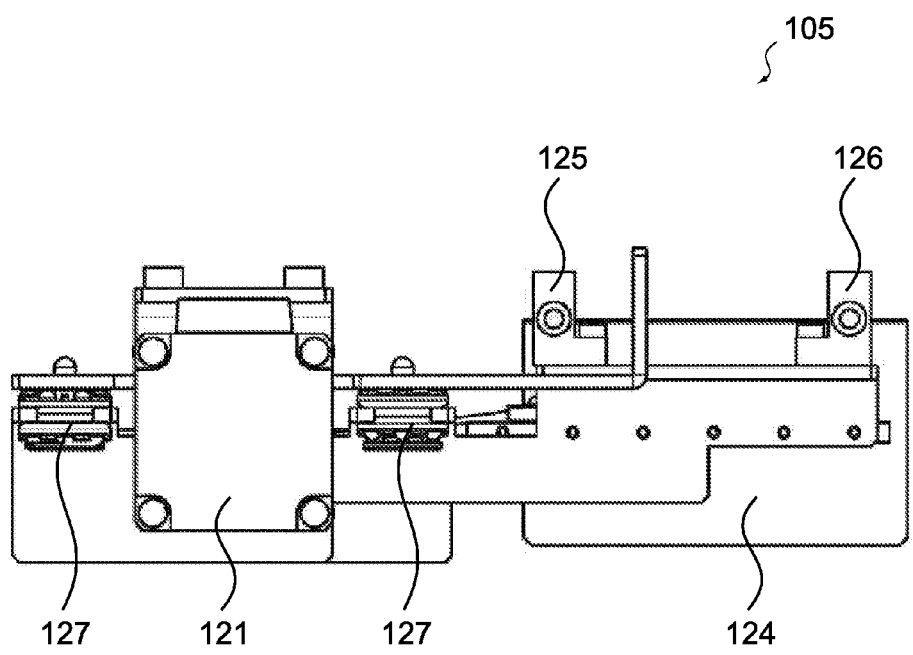
FIG. 3 A plan view of a shutter mechanism of the microscope.
Figure 4:
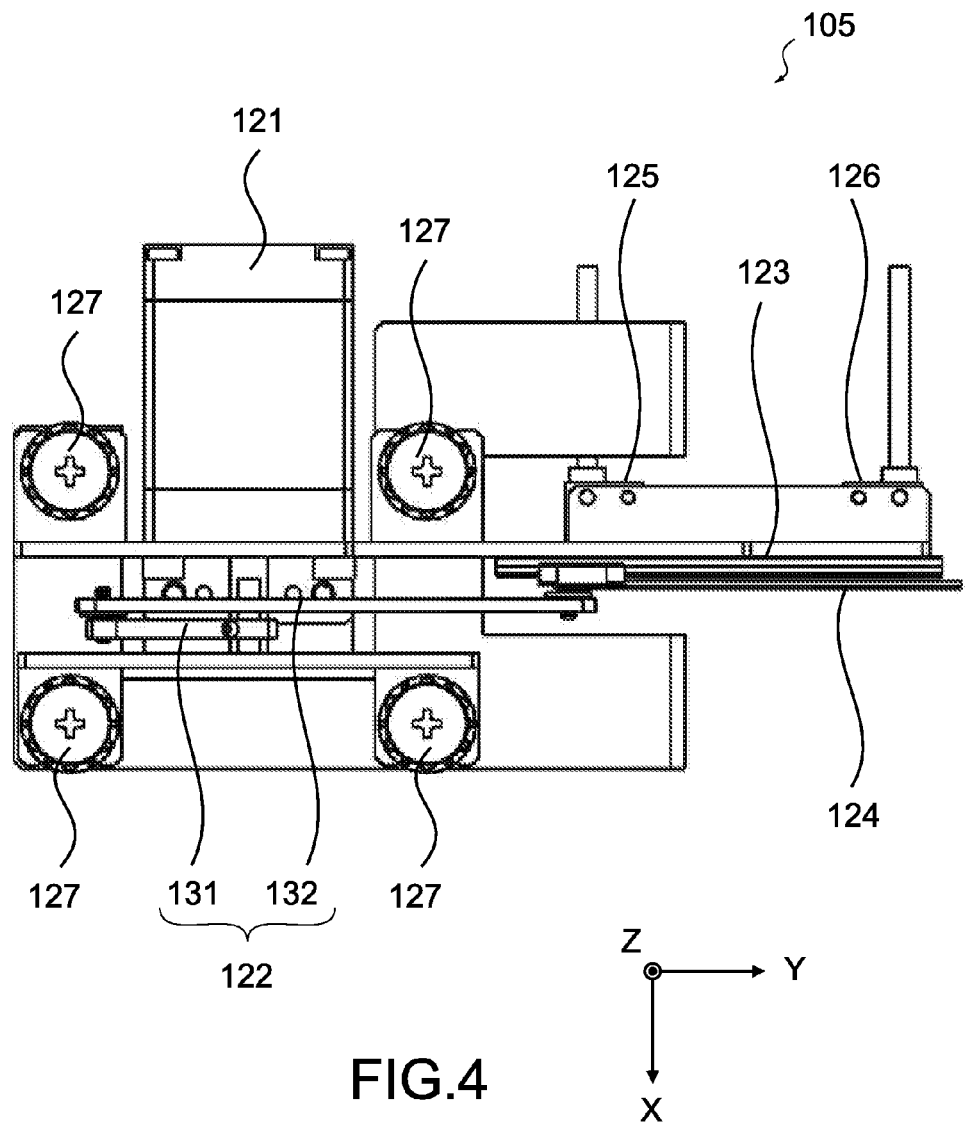
FIG. 4 A plan view of the shutter mechanism of the microscope.
Figure 5:
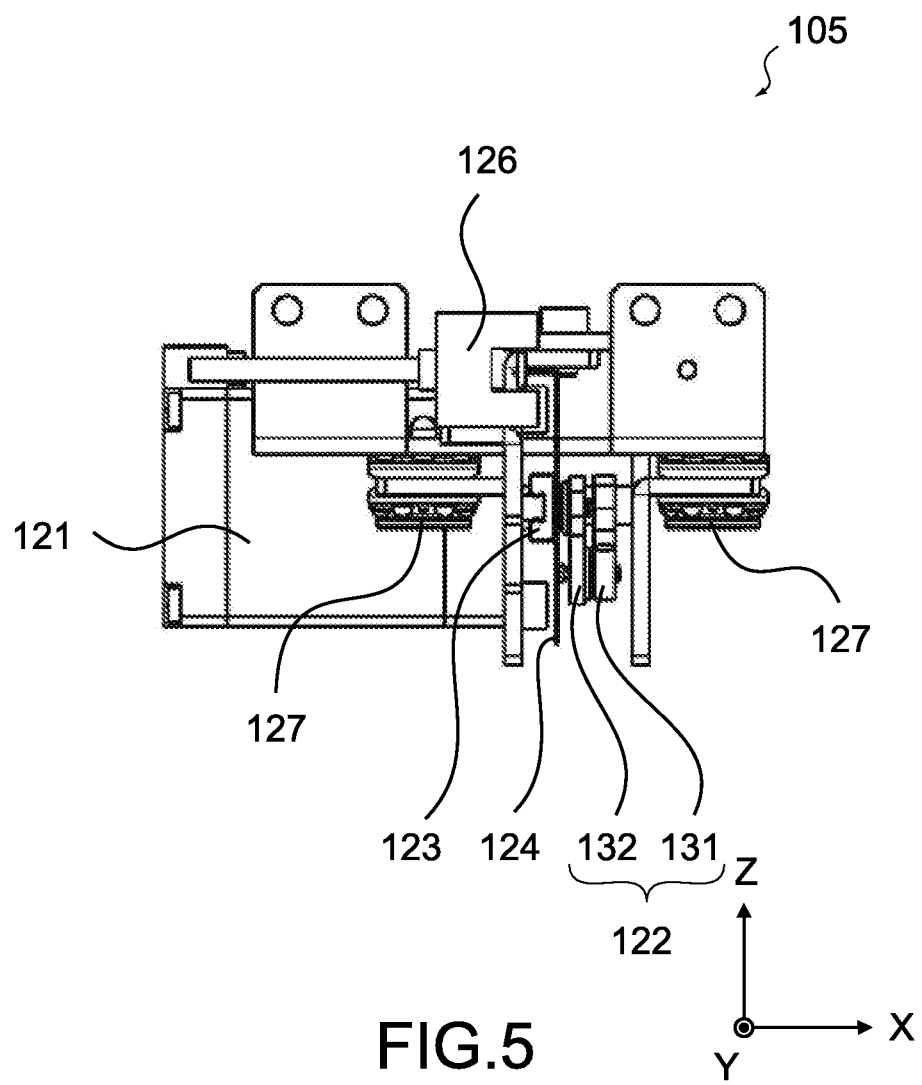
FIG. 5 A plan view of the shutter mechanism of the microscope.
Figure 6:
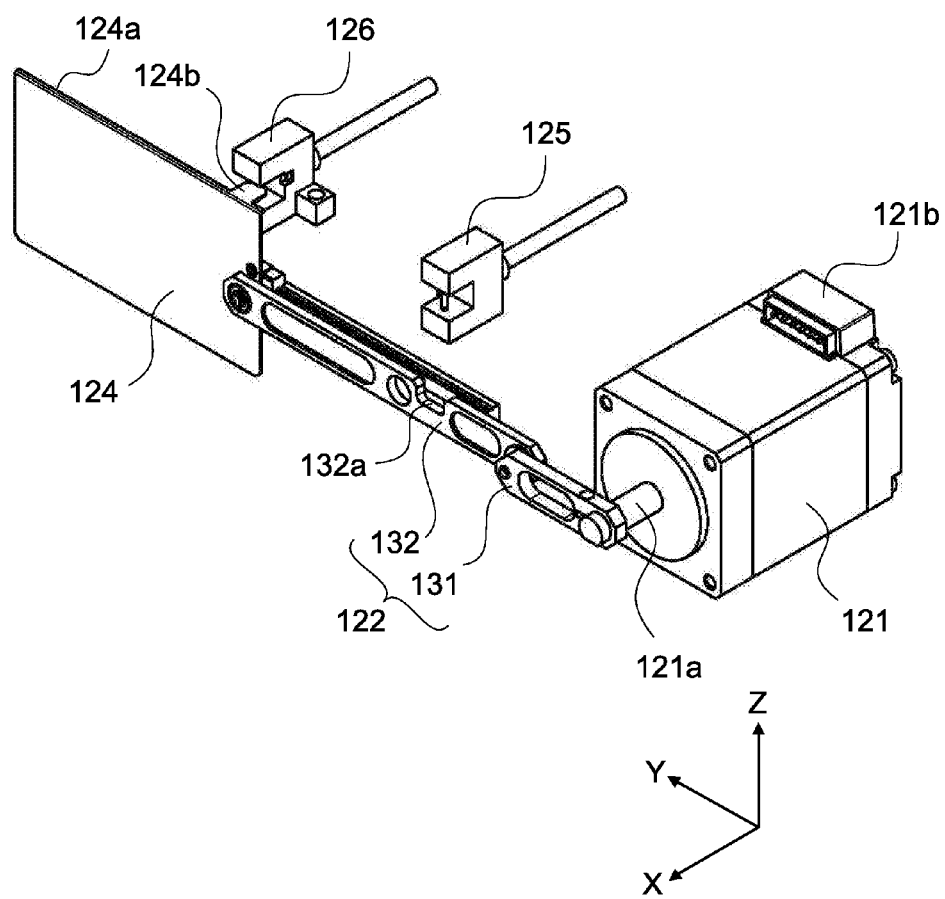
FIG. 6 A perspective view showing a partial configuration of the shutter mechanism of the microscope.
Figure 7:
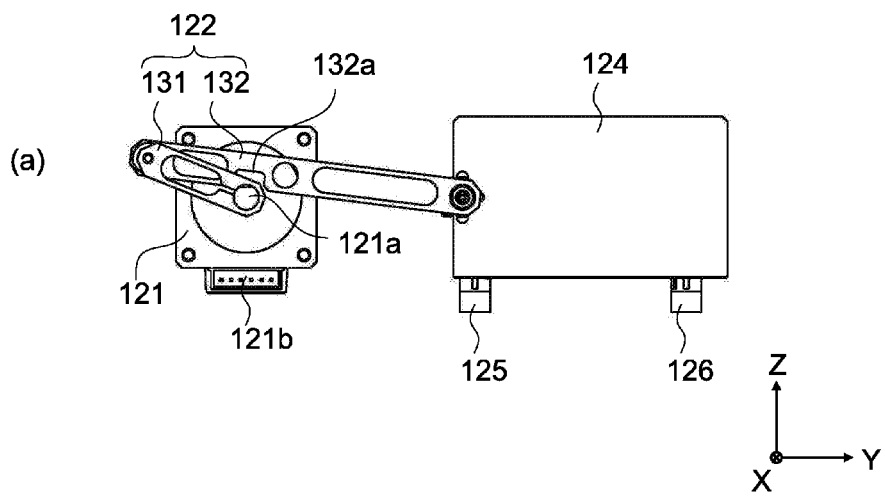
FIG. 7 A schematic diagram showing each state of the shutter mechanism of the microscope.
Figure 7:
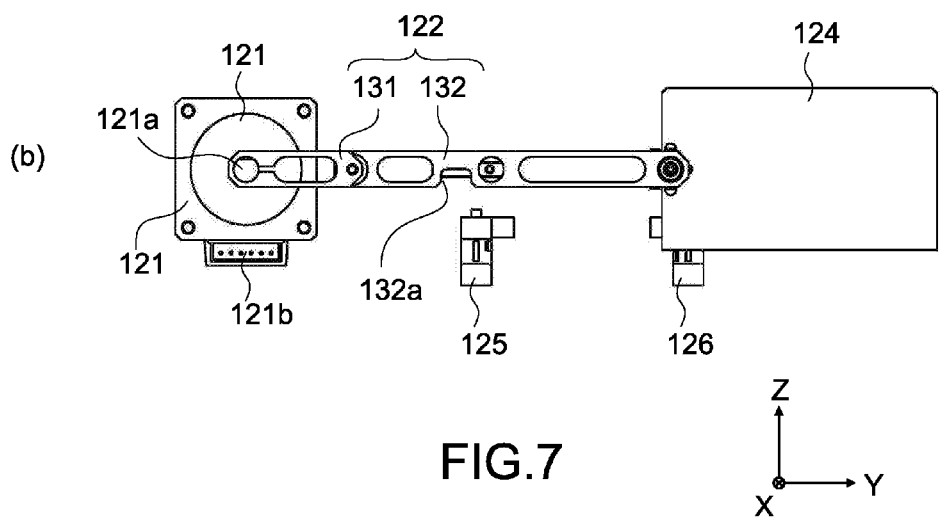

FIG. 3 to FIG. 5 are each a plan view of the shutter mechanism 105 viewed from each direction, FIG. 6 is a perspective view showing the partial configuration of the shutter mechanism 105, and FIG. 7 is a schematic diagram showing each state of the shutter mechanism 105. FIG. 7(a) shows the state where the imaging optical path L2 is blocked (closed state), and FIG. 7(b) shows the state where the imaging optical path L2 is not blocked (opened state). As shown in these figures, the shutter mechanism 105 includes a rotation power source 121, a crank 122, a linear guide 123, a shutter 124, an opening-detection sensor 125, a closing-detection sensor 126, and a fixed member 127.

The rotation power source 121 is a power source that generates rotation power, and the rotational axis is referred to as a rotation power axis 121a (see FIG. 6). Moreover, the rotation power source 121 can be a motor, and is favorably a stepping motor particularly. The stepping motor rotates at the rotational amount (rotational angle) depending on the number of pulses when pulse power is supplied thereto, and a stopping torque is generated on the rotation power axis 121a when pulse power is not supplied. Specifically, the stepping motor can control the rotational amount with high accuracy, and can maintain the rotation stopping position. In addition, the stepping motor can control the rotation rate by the supplying speed of a pulse (the number of pulses in a unit time).

The rotation power source 121 can be connected to a controller (not shown), and can be supplied with driving power such as the above-mentioned pulse power from the controller. A connector to which a power line from such a controller is connected is referred to as a connector 121b (see FIG. 6).

Hereinafter, the axial direction of the rotation power axis 121a is referred to as an X direction, and a direction in which the shutter 124 moves back and forth, which is perpendicular to the X direction, is referred to as a Y direction. Moreover, a direction perpendicular to the X direction and the Y direction is referred to as a Z direction.

The crank 122 connects the rotation power axis 121a of the rotation power source 121 with the shutter 124, and converts the rotational movement of the rotation power axis 121a into the back-and-forth movement of the shutter 124. The crank 122 may include a first arm 131 and a second arm 132. One end of the first arm 131 is fixed to the rotation power axis 121a, and the other end is rotatably connected to the second arm 132. The length of the first arm 131 is not particularly limited, but is favorably shorter than the second arm 132 because the rotational torque of the rotation power axis 121a can be reduced.

One end of the second arm 132 is rotatably connected to the first arm 131, and the other end is rotatably connected to the shutter 124. The length of the second arm 132 is favorably longer than the first arm 131 so that the rotational movement of the first arm 131 that rotate with the rotation power axis 121a can be converted into the back-and-forth movement. Moreover, in the second arm 132, a cutout 132a is formed. As shown in FIG. 7(a), the cutout 132a prevents the second arm 132 from interfering with the rotation power axis 121a, and the detail thereof will be described later.

The linear guide 123 (see FIG. 4 and FIG. 5) guides the back-and-forth movement of the shutter 124. The linear guide 123 may be a rail-shaped member that extends along the Y direction, and a part of the member the shutter 124 is slidably inserted in the linear guide 123, thereby guiding the movement direction of the shutter 124. The linear guide 123 can be a one that is capable of guiding the back-and-forth movement of the shutter 124, and the shape or arrangement thereof is not particularly limited.

The shutter 124 is configured to be capable of moving back and forth along the Y direction by the crank 122 and blocking the optical path L2 (see FIG. 2), as described above. The shutter 124 is a plate-like member, and is connected to the crank 122 so that the main surface thereof is in parallel with a plane perpendicular to the X direction (Y-Z plane).

The shutter 124 only needs to have light-blocking properties, and the material or thickness thereof is not particularly limited. The size of the shutter 124 only needs to be a size that is sufficient to prevent light passing through the optical path L2 toward the imaging element 106 from entering, and can be determined depending on the size of the light-receiving area of the imaging element 106 or the distance between the shutter 124 and the imaging element 106.

It should be noted that the shutter 124 is favorably light in weight. This is because it is possible to reduce the driving torque of the rotation power source 121 (torque required for driving the shutter 124) if the weight of the shutter 124 is light. However, if the shutter 124 includes a member that is light in weight and low strength, deformation such as deflection may be generated. Even if the degree of the deformation such as deflection is not one that affects the light-blocking properties of the shutter 124 (about several microns), the shutter 124 may be damaged due to fatigue of metals by the repeat of deformation due to the back-and-forth movement. Therefore, as one way, the deformation such as deflection can be prevented by making the centroid of the shutter 124 have a particular relationship with the crank 122 (to be described later).

Furthermore, also by bending the shutter 124 from the main surface to form a rib, it is possible to increase the strength of the shutter 124 and to prevent the deformation such as deflection. FIG. 6 shows a rib 124a formed in the shutter 124. The rib 124a is formed by bending the end portion of the shutter 124 in a vertical direction (X-Y plane) from the main surface (Y-Z plane). Furthermore, the rib 124a can be used to form a member for detecting the opening-detection sensor 125 and the closing-detection sensor 126 to be described later. FIG. 6 shows a member for detection 124b in which a part of the rib 124a extends in the X-Y plane direction.

The opening-detection sensor 125 is a sensor that detects whether or not the shutter 124 is at a position at which the optical path L2 is not blocked (opened position). The opening-detection sensor 125 can output the detection results to a controller of the rotation power source 121.

The opening-detection sensor 125 can be specifically a photosensor, and is configured to include a light emitting unit and a light-receiving unit. The light-receiving unit receives light irradiated from the light emitting unit. When the shutter 124 is not at the opened position, the light-receiving unit receives irradiated light. When the shutter 124 is at the opened position, a member of the shutter 124 (member for detection 124b) blocks the irradiated light, and the light-receiving unit does not receive irradiated light. Accordingly, it is possible to detect whether or not the shutter 124 is at the opened position. Moreover, the opening-detection sensor 125 does not necessarily be a photosensor, and may be the one that can detect whether or not the shutter 124 is at the opened position.

The closing-detection sensor 126 is a sensor that detects whether or not the shutter 124 is at a position at which the optical path L2 is blocked (closed position). The closing-detection sensor 126 can output the detection results to a controller of the above-mentioned rotation power source 121.

The closing-detection sensor 126 can be specifically a photosensor, and is configured to include a light emitting unit and a light-receiving unit. The light-receiving unit receives light irradiated from the light emitting unit. When the shutter 124 is not at the closed position, the light-receiving unit receives irradiated light. When the shutter 124 is at the closed position, a member of the shutter 124 (member for detection 124b) blocks the irradiated light, and the light-receiving unit does not receive irradiated light. Accordingly, it is possible to detect whether or not the shutter 124 is at the closed position. Moreover, the closing-detection sensor 126 does not necessarily be a photosensor, and may be the one that can detect whether or not the shutter 124 is at the closed position.

The opening-detection sensor 125 and a controller of the rotation power source 121 that receives the output of the closing-detection sensor 126 are capable of acquiring the position of the shutter 124, and it is possible to know whether or not the shutter 124 is opened or closed in accordance with the driving power supplied to the rotation power source 121. In the case where a problem occurs in the rotation power source 121 or the like and the shutter 124 is not normally opened or closed, the controller is capable of interrupting capturing of a microscopic image.

For example, in the case where the rotation power source 121 is a stepping motor, "a loss of synchronism" in which a rotor cannot follow the magnetic flux generated by a stator may occur. However, it is possible to prevent the capturing from continuing in such a case. Moreover, the controller can detect wear or the like of the member due to aging degradation or the like based on the opening and closing speed of the shutter 124, and present the replacement timing of the shutter mechanism 105 to the user.

The fixed member 127 causes the shutter mechanism 105 to be fixed to the main body of the microscope 100. The fixed member 127 includes a vibration absorption member, and causes the shutter mechanism 105 to be fixed to the main body via the vibration absorption member. The vibration absorption member can be an elastic member such as rubber and sponge. Because the vibration absorption member absorbs the vibration generated by the rotation of the rotation power source 121 or the motion of the shutter 124, it is possible to suppress the effect on imaging due to such vibration.

[Opening and Closing Operation of Shutter]

The opening and closing operation of the shutter 124 by the shutter mechanism 105 will be described.

Figure 8:
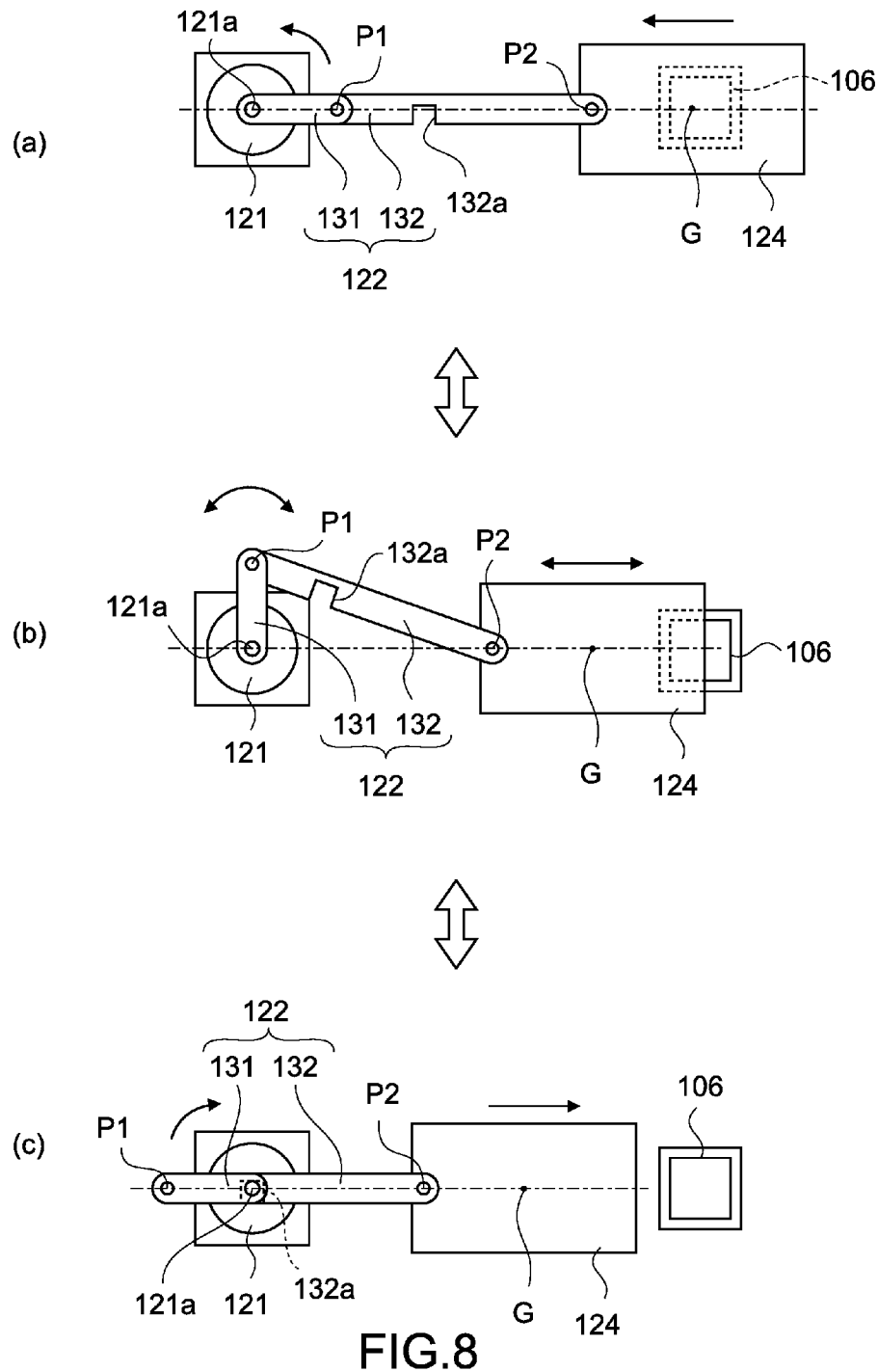
FIG. 8 A schematic diagram showing a shutter opening and closing operation of the shutter mechanism of the microscope.

FIG. 8 is a schematic diagram showing the opening and closing operation of the shutter 124. FIG. 8(a) shows a state where the shutter 124 is at the closed position (close state), FIG. 8(b) shows a state where the shutter 124 is between the closed position and the opened position (intermediate state), and FIG. 8(c) shows a state where the shutter 124 is at the opened position (opened state). In FIGS. 8(a) to (c), the rotational axis of the first arm 131 and the second arm 132 is referred to as a rotational axis P1, the rotational axis of the second arm 132 and the shutter 124 is referred to as a rotational axis P2, and the centroid of the shutter 124 is referred to as a centroid G.

In the closed state shown in FIG. 8(a), when the rotation power axis 121a rotates (counterclockwise in the figure), the first arm 131 rotates about the rotation power axis 121a and the second arm 132 moves in synchronization with the first arm 131. At this time, because the movement direction of the shutter 124 is restricted by the linear guide 123, the shutter 124 moves in a direction toward the rotation power axis 121a (left direction in the figure). Therefore, the state of the crank 122 and the shutter 124 changes from the closed state shown in FIG. 8a) to the opened state shown in FIG. 8(c) through the intermediate state shown in FIG. 8(b).

Similarly, in the closed state shown in FIG. 8(c), when the rotation power axis 121a rotates (clockwise in the figure), the second arm 132 moves with the rotation of the first arm 131, and the shutter 124 moves in a direction away from the rotation power axis 121a (right direction in the figure). Therefore, the state of the crank 122 and the shutter 124 changes from the state shown in FIG. 8(c) to the opened state shown in FIG. 8(a) through the intermediate state shown in FIG. 8(b).

As described above, the rotation power axis 121a rotates in one direction and in a rotation direction opposite thereto alternately. Accordingly, the shutter 124 moves between the opened state and the closed state, i.e., moves back and forth. As a result, the imaging element 106 that is located behind the shutter 124 is blocked by the shutter 124 or released from the blocking.

[Connection State of Crank]

In the closed state shown in FIG. 8(a), the crank 122 can be configured so that the rotation power axis 121a, the rotational axis P1, and the rotational axis P2 are arranged in the same straight line in the stated order. Moreover, in the closed state shown in FIG. 8(c), the crank 122 can be configured so that the rotational axis P1, the rotation power axis 121a, and the rotational axis P2 are arranged in the same straight line in the stated order.

Figure 9:
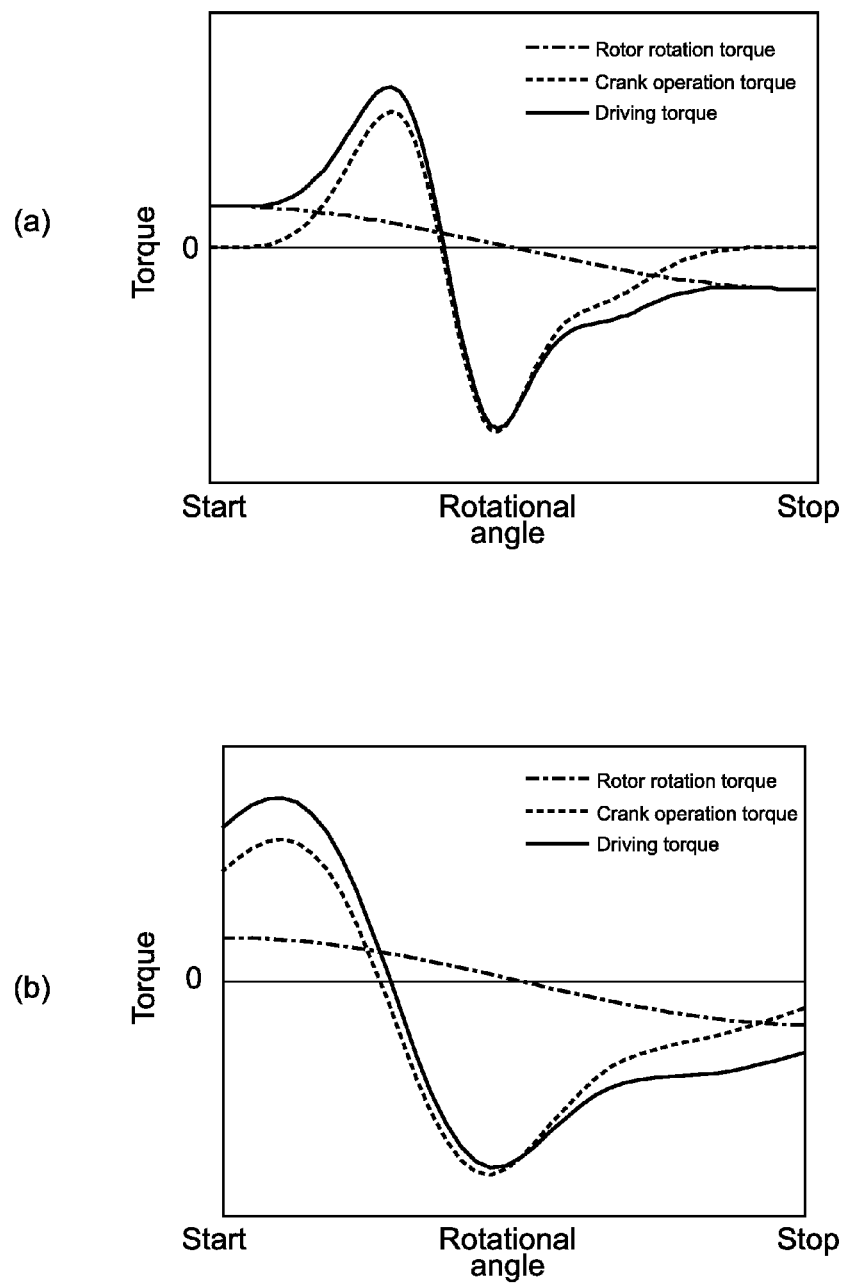
FIG. 9 A graph showing a relationship between a rotational angle of a rotation power source of the shutter mechanism of the microscope and a torque that is needed to be generated by the rotation power source.

Because the crank 122 is configured as described above, it is possible to minimize the driving torque of the rotation power axis 121a in the closed state shown in FIG. 8(a) and the opened state shown in FIG. 8(c). FIG. 9 is a graph showing a relationship between a rotational angle of the rotation power axis 121a and a torque that is needed to be generated by the rotation power source 121. FIG. 9(a) is a graph in a connection state according to the above-mentioned embodiment, and FIG. 9(b) is a graph in a connection state according to a comparative example. The graph shown in FIG. 9(b) is a graph showing a connection state in which an angle between a straight line that connects the rotation power axis 121a with the rotational axis P1 and a straight line that connects the rotational axis P1 and the rotational axis P2 is 45° in the closed state, and is 135° in the opened state.

In FIG. 9(a) and FIG. 9(b), the "rotor rotation torque" is a torque that is needed to rotate the rotor of the rotation power source 121. It is identical in FIG. 9(a) and FIG. 9(b). As shown in FIG. 9(a) and FIG. 9(b), the rotor rotation torque is increased at a rotation starting angle and a rotation finishing angle.

In FIG. 9(a) and FIG. 9(b), the "crank operation torque" is a torque that is needed to operate the crank 122 connected to the rotation power axis 121a from the opened state to the closed state or from the closed state to the opened state. In FIG. 9(a), the crank operation torque at the rotation starting angle and the rotation finishing angle is 0. On the other hand, in FIG. 9(b), the crank operation torque at the rotation starting angle and the rotation finishing angle is not 0. This is because the torque reaction force of the rotational axis P1 is the minimum when the rotation power axis 121a, the rotational axis P1, and the rotational axis P2 are arranged in the same straight line.

In FIG. 9(a) and FIG. 9(b), the "driving torque" is the sum of the rotor rotation torque and the crank operation torque, and the rotation power source 121 causes the rotation power axis 121a to generate the torque. The rotor rotation torque is the same in FIG. 9(a) and FIG. 9(b). However, because the crank operation torque is different as described above, the driving torque at the rotation starting angle and the rotation finishing angle is smaller in FIG. 9(a).

Specifically, in the shutter mechanism 105 according to this embodiment, with the above-mentioned connection state of the crank 122, it is possible to minimize the driving torque that is needed to be generated by the rotation power source 121 at the rotation starting angle and the rotation finishing angle as compared with other connection states. In other words, the shutter 124 stops at a position where the operation torque that is needed when the rotation power axis 121a starts to rotate is minimized. Therefore, it is possible to suppress the loss of synchronism of the rotation power source 121 when the shutter 124 starts to open and close. Moreover, it is possible to use a rotation power source having a small operation torque as the rotation power source 121.

It should be noted that the cutout 132a provided to the second arm 132 can suppress the interference of the second arm 132 and the rotation power axis 121a in the closed state shown in FIG. 8(c), and makes it possible to arrange the rotational axis P1, the rotation power axis 121a, and the rotational axis P2 in the same straight line. In the case where the shape of the second arm 132 does not generate interference of the second arm 132 and the rotation power axis 121a (e.g., the second arm 132 is curved), the cutout 132a does not necessarily need to be provided.

Furthermore, the crank 122 can be connected to the shutter 124 so that the straight line that connects the rotational axis P2 with the centroid G is in parallel with the movement direction of the shutter 124 (Y direction). Accordingly, it is possible to prevent the shutter 124 from deflecting in a direction perpendicular to the movement direction of the shutter 124 (Z direction), and to make the back-and-forth movement of the shutter 124 smooth.

As described above, because the crank 122 is configured so that the rotation power axis 121a, the rotational axis P1, and the rotational axis P2 are arranged in the same straight line in the closed state and the opened state, it is possible to minimize the driving torque of the rotation power source 121. However, the connection state of the crank 122 is not limited to the one described above, and can be a connection state where the rotation power axis 121a, the rotational axis P1, and the rotational axis P2 are not in the same straight line in the closed state or the opened state, as shown in FIG. 7(a). This is effective in the case where the arrangement space of the shutter mechanism 105 is limited, for example.

It should be noted that in the above description, one rotation power source 121 drives the shutter 124. However, it is not limited thereto. For example, a plurality of rotation power sources 121 can be connected to the shutter 124 with the crank 122 to drive the shutter 124.

[Regarding Pulse Power Control]

Figure 10:
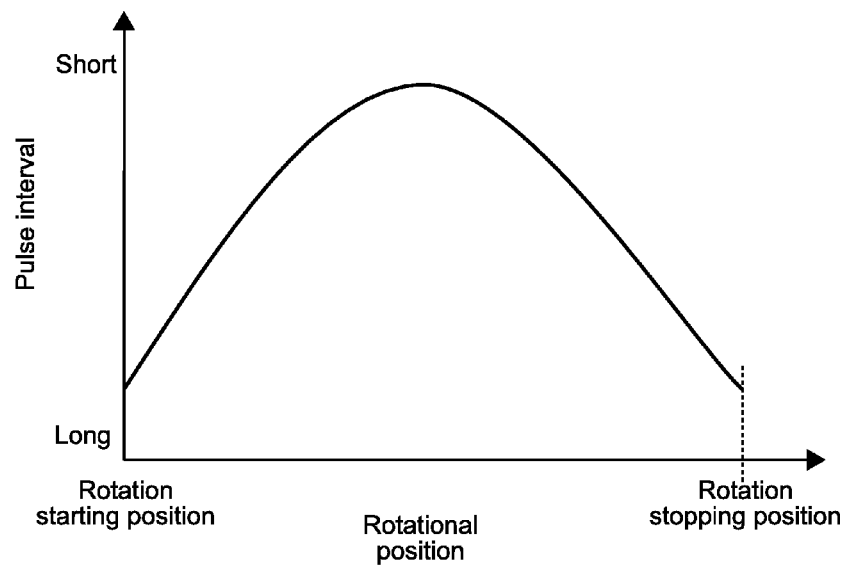
FIG. 10 A control profile of pulse power supplied to the rotation power source of the shutter mechanism of the mechanism.

As described above, a stepping motor can be used as the rotation power source 121. The stepping motor can be driven by supplying pulse power. In the following, control of pulse power by the controller of the rotation power source 121 will be described. FIG. 10 is a control profile of pulse power, and shows a pulse interval with respect to the rotational position of the rotation power axis 121a (rotational angle). The rotation starting position is a rotational position where the rotation power axis 121a starts to rotate (shutter 124 starts to move), and the rotation stopping position is a rotational position where the rotation power axis 121a stops rotating (shutter 124 stops moving). Specifically, between the rotation starting position to the rotation stopping position, the state of the shutter mechanism 105 changes from the closed state to the opened state, or from the opened state to the closed state.

Figure 11:
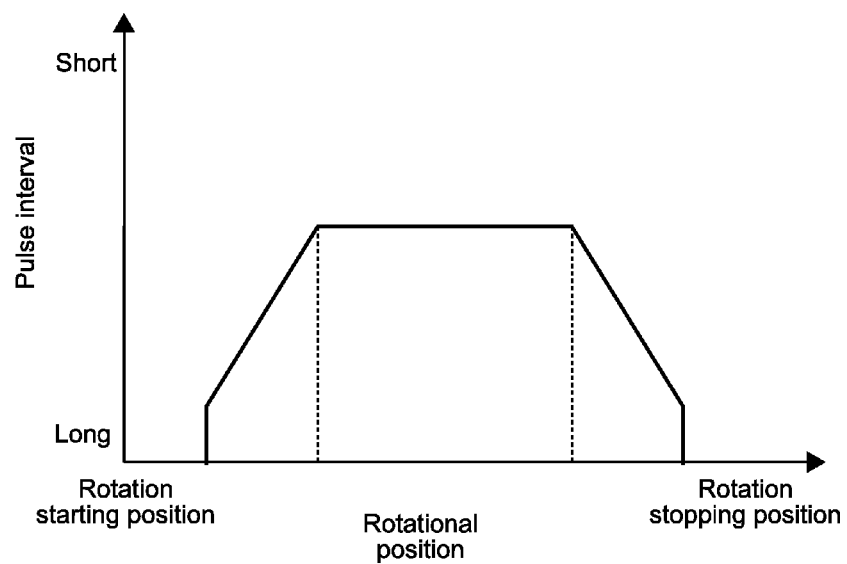
FIG. 11 A control profile of an interval of pulse power supplied to a rotation power source of a shutter mechanism of a microscope according to a comparative example.

FIG. 11 is a control profile of a pulse interval where the rotation rate is reduced at the acceleration time and the deceleration time, which is called trapezoidal drive that is generally used for driving a stepping motor. As compared with this, with the profile approximated by a Sin wave as shown in FIG. 10, it is possible to accelerate and decelerate smoothly, and suppress the loss of synchronism due to the reduction of vibration and the rapid change in speed.

As shown in FIG. 10, this control profile is a profile that is approximated with a Sin curve where a pulse interval are prolonged at the rotation starting position, the pulse interval is shortened as away from the rotation starting position, and the pulse interval is prolonged again as approaching the rotation stopping position.

In such a control profile, the rotation torque of the rotation power axis 121a is large and the rotation rate is low at the rotation starting position, and the rotation torque is reduced and the rotation rate is increased as being away from the rotation starting position. Furthermore, as approaching the rotation stopping position, the rotation torque is increased again and the rotation rate is reduced. Moreover, the increment and decrement of the rotation torque and the rotation rate change consecutively.

Accordingly, it is possible to drive the shutter mechanism 105 with a large rotation torque in the vicinity of the rotation starting position, and to suppress the loss of synchronism of a stepping motor. Moreover, after the rotation power axis 121a starts to rotate, because a large rotation torque is not needed, it is possible to increase the driving speed of the shutter mechanism 105. In the vicinity of the rotation stopping position, it is possible to break the shutter mechanism 105 with a large rotation torque, and to suppress the loss of synchronism of a stepping motor.

Furthermore, because the shutter mechanism 105 can be decelerated and stopped by the rotation torque of the rotation power source 121, a stopper or the like for stopping the shutter mechanism 105 is not needed, and it is possible to suppress the vibration due to collision of the shutter 124 to the stopper.

Figure 12:
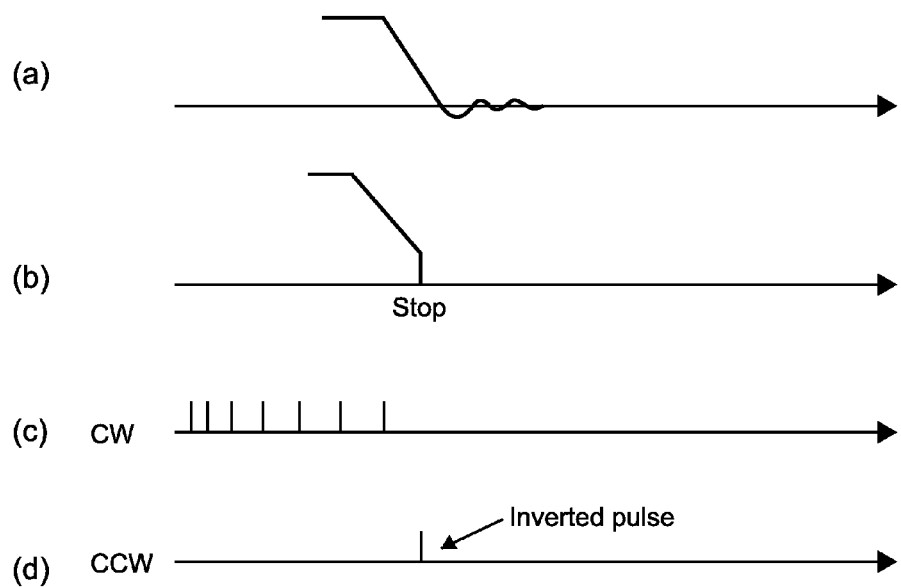
FIG. 12 A schematic diagram showing supply timings of inverted pulse supplied to the rotation power source of the shutter mechanism of the microscope according to an embodiment of the present technology.

Moreover, it is possible to use a control method of supplying an inverted pulse when a stepping motor stops rotating. FIG. 12 is a schematic diagram showing supply timings of an inverted pulse. FIG. 12(*a*) shows a rotation rate of the stepping motor in the case where an inverted pulse is not supplied, and FIG. 12(*b*) shows a rotation rate of the stepping motor in the case where an inverted pulse is supplied. FIG. 12(*c*) shows supply timings of a pulse that generates a rotation torque toward one direction (CW), and FIG. 12(*d*) shows supply timings of a pulse (inverted pulse) that generates a rotation torque (inverted torque) toward a direction opposite thereto (CCW).

As shown in FIG. 12(*c*), by gradually increasing the supply interval of a pulse, it is possible to reduce the rotation rate of the stepping motor. However, it needs a time until the rotation becomes static as it is after the stepping motor stops rotating) (see FIG. 12(*a*)). In view of the above, by supplying an inverted pulse to the stepping motor at a timing when the rotation is desired to be stopped, it is possible to quickly stop the stepping motor with the inverted torque (see FIG. 12(*b*)), i.e., increase the static speed.

[Operation of Microscope]

Figure 13:
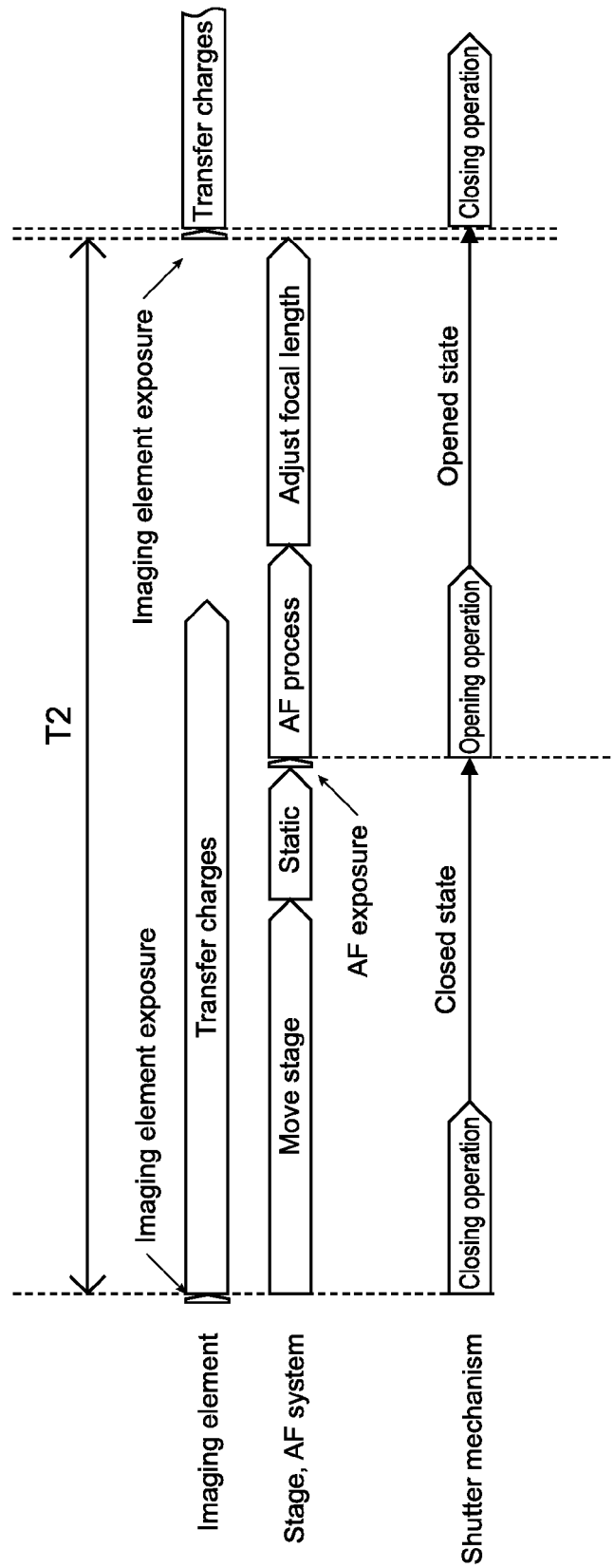
FIG. 13 A time chart of the operation of the microscope.
Figure 14:
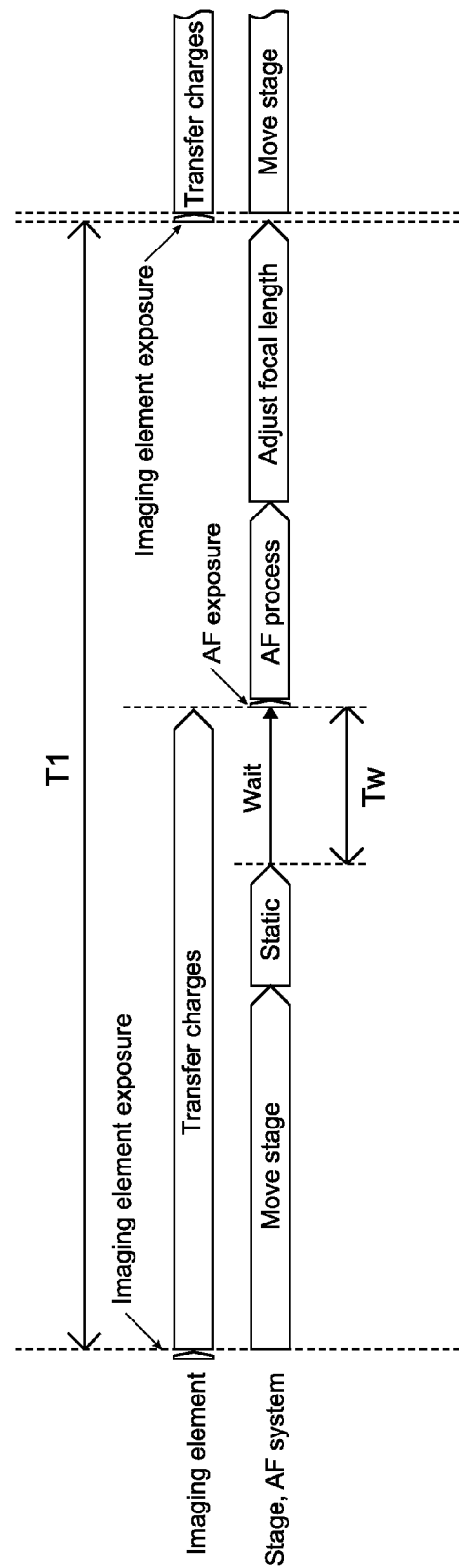
FIG. 14 A time chart of the operation of a microscope according to a comparative example.

The operation of the microscope 100 configured as described above will be described. FIG. 13 is a time chart of the operation of the microscope 100. FIG. 14 is a time chart of the operation of a microscope according to a comparative example. The microscope according to the comparative example is obtained by excluding the shutter mechanism 105 from the microscope 100 according to this embodiment.

First, the time chart of the operation of the microscope according to the comparative example shown in FIG. 14 will be described. The figure is a time chart from when after imaging in a predetermined range of a slide is performed to when capturing in the next imaging range is performed. After the imaging element (CMOS) is exposed (imaging element exposure), charges of the imaging element are transferred. The stage is moved toward the next imaging range in parallel with the transferring charges, and becomes static.

Next, the AF sensor is exposed (AF exposure). However, because also the imaging element receives light if the AF exposure is performed right after the stage becomes static, it waits until the transferring of charges is completed. Hereinafter, the wait time is referred to as time Tw. After the transferring of charges of the imaging element is completed, the AF exposure is performed and a focal depth is calculated based on the output of the AF sensor (AF process).

Next, the position of the stage (Z position) or the like is moved corresponding to the calculated focal depth, and the focal length is adjusted. Accordingly, imaging of the next imaging range is prepared, and imaging of the imaging range (imaging element exposure) is performed. FIG. 14 shows a time from the imaging element exposure to the next imaging element exposure (imaging interval) as a time T1. As described above, in the microscope according to the comparative example, a wait time (time Tw) is generated until the transferring of the charges of the imaging element is completed.

On the other hand, in the case of the microscope 100 according to this embodiment, a time chart from when after imaging of a predetermined range of a slide is performed to when imaging of the next imaging range is performed is as shown in FIG. 13. After the imaging element 106 is exposed (imaging element exposure), transferring of the charges of the imaging element 106 is performed. In parallel with the transferring of charges, the stage 101 is moved toward the next imaging range and becomes static. Furthermore, after the imaging element exposure is finished, closing of the shutter 124 is started (closing operation) and the shutter 124 is closed (closed state).

Right after the stage 101 becomes static, the AF sensor 108 is exposed (AF exposure). Unlike the microscope according to the comparative example, the imaging element 106 is blocked by the shutter 124. Therefore, it is possible to perform the AF exposure right after the stage 101 becomes static. After the AF exposure, the focal depth is calculated based on the output of the AF sensor 108 (AF process). Furthermore, after the AF exposure is finished, the shutter 124 starts to open (opening operation), and the shutter 124 is opened (opened state).

Next, the position of the stage (Z position) or the like is moved corresponding to the calculated focal depth, and the focal length is adjusted. Accordingly, imaging of the next imaging range is prepared, and imaging of the imaging range (imaging element exposure) is performed. When the imaging element exposure is finished, the shutter mechanism 105 starts to close the shutter 124 again.

FIG. 13 shows a time from the imaging element exposure to the next imaging element exposure (imaging interval) as a time T2. As compared with the microscope according to the comparative example, in the microscope 100 according to this embodiment, because a wait time (time Tw) is not generated, the time T2 is shorter than the time T1 by the time Tw. Accordingly, it is possible to perform imaging (imaging element exposure) at high speed. The time Tw that can be reduced in one imaging is short (about several milliseconds). However, because imaging is performed in one slide several thousand times in some cases, it is possible to reduce a time considerably when the time Tw for each time is integrated.

Moreover, the time that is required for moving the stage and making the stage static can be reduced by improvement of a stage drive mechanism or the like. However, in the microscope according to the comparative example, even if the time is reduced, the wait time (time Tw) is prolonged, which does not lead to the reduction of the imaging interval (time T1). On the other hand, in the microscope 100 according to this embodiment, if the time that is required for moving the stage and making the stage static is reduced, it is possible to reduce the imaging time (time T2) by the reduction time.

The present technology is not limited to the above-mentioned embodiments and various modifications can be made without departing from the gist of the present technology.

The shutter mechanism according to this embodiment has been described to be used in a microscope. However, it is not limited thereto. For example, it can be used as a shutter mechanism of an imaging apparatus such as a camera. Moreover, it can be used as a shutter mechanism for blocking not only a light beam but also another electromagnetic wave or material.

It should be noted that the present technology may also take the following configurations.

(1) A microscope, including:
    an optical system;
    a first light-receiving element; and
    a shutter mechanism including
        a rotation power source that generates rotation power
        a crank that converts the rotation power generated by the rotation power source into a back-and-forth movement, and a shutter connected to the crank, the shutter moving back and forth according to the crank between a first position at which a first optical path from the optical system to the first light-receiving element is blocked and a second position at which the first optical path is not blocked.

(2) The microscope according to (1) above, in which
the crank includes a first arm fixed to a rotation power axis of the rotation power source and a second arm that is rotatably connected to the first arm and the shutter,
the first arm and the second arm are connected to each other with a first rotational axis, and
the second arm and the shutter are connected to each other with a second rotational axis.

(3) The microscope according to (1) or (2) above, in which
the rotation power axis, the rotational axis, and the rotational axis are arranged in the same straight line when the shutter is at the first position or the second position.

(4) The microscope according to any one of (1) to (3) above, in which
the rotation power source is a stepping motor.

(5) The microscope according to any one of (1) to (4) above, further including
a controller that supplies pulse power to the stepping motor, the controller reducing a pulse interval of the pulse power as the shutter is away from the first position or the second position.

(6) The microscope according to any one of (1) to (5) above, further including:
a second light-receiving element; and
an optical path separation unit that separates the first optical path and a second optical path from the optical system to the second light-receiving element.

(7) The microscope according to any one of (1) to (6) above, in which
the first light-receiving element is an element for capturing an image, and
the second light-receiving element is an element for detecting a focal depth.

(8) The microscope according to any one of (1) to (7), in which
the element for capturing an image is a CMOS image sensor.

(9) The microscope according to any one of (1) to (8), in which
the shutter mechanism is fixed to the optical system via a vibration absorption member.

(10) The microscope according to any one of (1) to (9), further including:
a first detection sensor that detects the shutter at the first position; and
a second detection sensor that detects the shutter at the second position.

(11) A shutter mechanism, including:
a rotation power source that generates rotation power
a crank that converts the rotation power generated by the rotation power source into a back-and-forth movement, and
a shutter connected to the crank, the shutter moving back and forth according to the crank between a first position at which an optical path from an optical system to a first light-receiving element is blocked and a second position at which the optical path is not blocked.

(12) The shutter mechanism according to (11) above, further including
a controller that supplies pulse power to the stepping motor, the rotation power source being a stepping motor, the controller supplying pulse power to the stepping motor so that a driving profile of a pulse interval is a Sin curve.

(13) The shutter mechanism according to (11) or (12) above, further including
a controller that supplies pulse power to the stepping motor, the rotation power source being a stepping motor, the controller supplying inverted pulse to the stepping motor when the stepping motor is stopped.

(14) An imaging apparatus for a microscope used in pathology, including
a mechanistic light blocking means provided right before an imaging element.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

DESCRIPTION OF REFERENCE NUMERALS 100 microscope
101 stage
102 objective lens barrel
103 imaging lens barrel
104 optical path separation unit
105 shutter mechanism
106 imaging element
107 autofocus lens barrel
108 autofocus sensor
109 optical system
110 autofocus optical system
121 rotation power source
122 crank
123 linear guide
124 shutter
125 opening-detection sensor
126 closing-detection sensor
127 fixed member
131 first arm
132 second arm

The invention claimed is:
1. A microscope, comprising:
an optical system;
a first light-receiving element;
a shutter mechanism including
a rotation power source that generates rotation power
a crank that converts the rotation power generated by the rotation power source into a back-and-forth movement, and
a shutter connected to the crank, the shutter moving back and forth according to the crank between a first position at which a first optical path from the optical system to the first light-receiving element is blocked and a second position at which the first optical path is not blocked;
a second light-receiving element; and
an optical path separation unit that separates the first optical path and a second optical path from the optical system to the second light-receiving element.

2. The microscope according to claim 1, wherein
the crank includes a first arm fixed to a rotation power axis of the rotation power source and a second arm that is rotatably connected to the first arm and the shutter,
the first arm and the second arm are connected to each other with a first rotational axis, and
the second arm and the shutter are connected to each other with a second rotational axis that is different than the first rotational axis.

3. The microscope according to claim 2, wherein
the rotation power axis, the first rotational axis, and the second rotational axis are arranged in a same straight line when the shutter is at the first position or the second position.

4. The microscope according to claim 1, wherein
the rotation power source is a stepping motor.

5. The microscope according to claim 4, further comprising
a controller that supplies pulse power to the stepping motor, the controller reducing a pulse interval of the pulse power as the shutter is away from the first position or the second position.

6. The microscope according to claim 1, wherein
the first light-receiving element is an element for capturing an image, and
the second light-receiving element is an element for detecting a focal depth.

7. The microscope according to claim 6, wherein
the element for capturing an image is a CMOS image sensor.

8. The microscope according to claim 1, wherein
the shutter mechanism is fixed to the optical system via a vibration absorption member.

9. The microscope according to claim 1, further comprising:
a first detection sensor that detects the shutter at the first position; and
a second detection sensor that detects the shutter at the second position.

* * * * *